United States Patent [19]

Osada et al.

[11] 4,216,810
[45] Aug. 12, 1980

[54] SAFETY WHEEL EMPLOYING A PLURALITY OF PROTECTOR ELEMENTS INTERCONNECTED BY SEPARATE BEAD STOPPER MEMBERS

[75] Inventors: Isao Osada, Izumi; Shoichi Sano, Tokorozawa, both of Japan

[73] Assignees: Ohtsu Tire & Rubber Co., Ltd., Izumiohtsu; Honda Giken Kogyo Kabushiki Kaisha, Tokyo, both of Japan

[21] Appl. No.: 2,393

[22] Filed: Jan. 10, 1979

[30] Foreign Application Priority Data

Jan. 19, 1978 [JP] Japan ................................. 53-4583

[51] Int. Cl.³ .......................... B60C 17/04; B60C 5/16
[52] U.S. Cl. .............................. 152/158; 152/330 RF; 152/330 L; 152/389; 152/400
[58] Field of Search ........... 152/152, 158, 157, 330 R, 152/330 RF, 330 L, 339, 340, 388–392, 393–395, 396–401

[56] References Cited

U.S. PATENT DOCUMENTS 4,159,730  7/1979  Osada et al. ..................... 152/158

Primary Examiner—John T. Goolkasian
Assistant Examiner—Lois E. Rodgers
Attorney, Agent, or Firm—Haseltine, Lake & Waters

[57] ABSTRACT

A safety wheel designed so that when air sealed within a tire is lost, the vehicle may be supported by a flat protector and bead stopper members in place of air pressure within the tire. The safety wheel comprises a split rim, a tubeless tire mounted on the split rim, and a flat protector of an annular configuration. The flat protector is divided into a plurality of circular protector elements whose opposed opposite ends are connected with each other through the bead stopper members adapted to restrain relative movement between the bead portions of the tire and the split rim.

5 Claims, 7 Drawing Figures

SAFETY WHEEL EMPLOYING A PLURALITY OF PROTECTOR ELEMENTS INTERCONNECTED BY SEPARATE BEAD STOPPER MEMBERS

BACKGROUND OF THE INVENTION

1. Field of the Invention

The present invention relates to a safety wheel which is designed so that when air sealed within a tire is lost due to puncture of the tire or the like, the vehicle may be supported by means in place of air pressure within the tire to permit safe and easy travelling of the vehicle without hindrance.

2. Description of the Prior Art

In general, it is extremely dangerous and actually difficult to replace a puncutered tire on expressways, congested roads or the like when air is lost by reason of a tire puncture, or for other reasons. Further, even on the roads which enable a punctured tire to be replaced, if the vehicle can travel safely and easily to the nearest repair shop or the like, the same is very convenient because a driver need not perform troublesome and time-consuming tire replacement on the road.

Under these circumstances, the development of safety tires has been desirous whereby even in the event the tire is punctured, the vehicle can be safely travelled upon to the repair shop or the like, with a minimal damage given to the tire in the puncture state. Various proposals have been made to provide for safety wheels in which a flat protector and a bead stopper for restraint of relative movement between the tire bead portions and a rim are possible and which are adapted to support the vehicle in place of air pressure within the tire when the latter is punctured. For example, such features may be incorporated into the tire to secure the safe travelling of the vehicle. However, according to the prior art, flat protector and bead stoppers have been suffered from disadvantages that the protector and stopper are complicated in construction and are hard to be incorporated into the tire.

SUMMARY OF THE INVENTION

A main object of the invention is to overcome the defects of the prior art.

The present invention overcomes the limitations noted above with respect to prior art by providing a safety wheel which is designed so that when air sealed within a tire is lost due to puncture or the like, the vehicle may be supported by appropriate means in place of air pressure within the tire to permit safe travelling of the vehicle.

The invention will be more readily understood from the ensuing description of one embodiment thereof in reference to the accompanying specification, claims and drawings.

DESCRIPTION OF THE PREFERRED EMBODIMENTS

Figure 1:
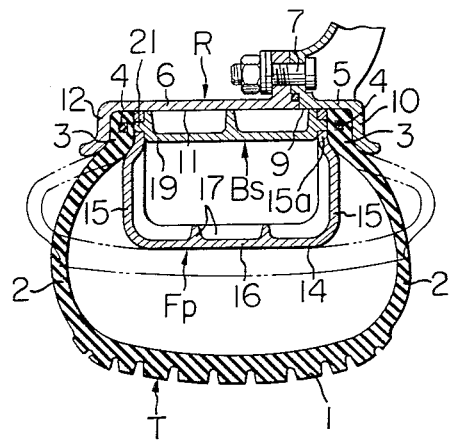
FIG. 1 is a partly longitudinal sectional view of a safety wheel in accordance with the present invention.
Figure 2:
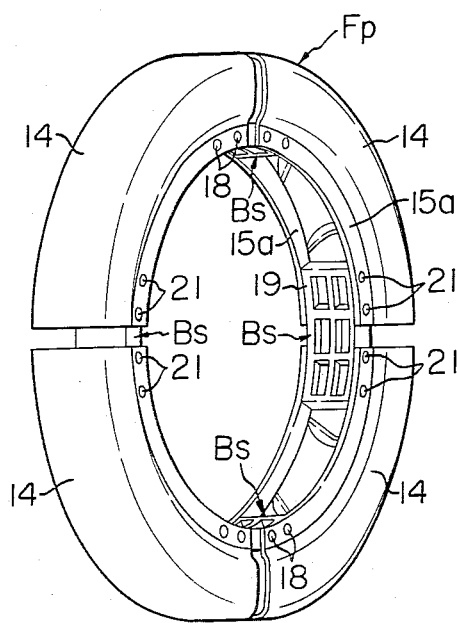
FIG. 2 is a perspective view showing the whole flat protector assembled by bead stopper members.
Figure 3:
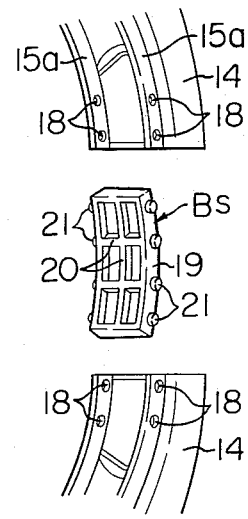
FIG. 3 is an exploded perspective view showing a main part of the protector.
Figure 4:
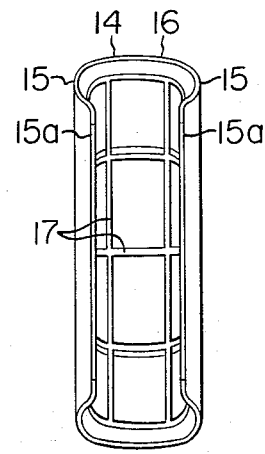
FIG. 4 is an internal illustration of a protector element.

Referring now to FIGS. 1 through 4, there is shown a safety wheel in accordance with the present invention. This safety wheel comprises a tubeless tire (hereinafter merely referred to as "tire") T, a split rim R, a flat protector $F_p$, and a plurality of bead stoppers $B_s$, which will be described hereinafter.

First, the tire T is constructed in the usual manner. A tread portion 1 has side walls 2, 2 integrally extended to right and left thereof, and bead portions 3, 3, which gradually increase their wall thickness, are integrally extended from side wall portions 2, 2, the bead portions 3, 3 having bead wires 4, respectively, embedded therein.

Next, the split rim R is constructed such that an outboard rim 5 is joined with an inboard rim 6, the outboard rim 5 and the inboard rim 6 being integrally connected by a plurality of connecting bolts 7 (only one of which is shown in FIG. 1). The outboard rim 5 has a narrow rim base 9 and a rim flange 10 extended towards an outer end thereof to hold one bead portion 3 of the tire T, and the inboard rim 6 has a wide rim base 11 and a rim flange 12 similarly extended towards an outer end thereof to hold the other bead portion 3 of the tire T. The rim bases 9 and 11 cooperate with each other to form a flat cylindrical supporting surface of the split rim R to support inner peripheral surfaces of the flat protector $F_p$ and bead stopper members $B_s$. The flat protector $F_p$ comprises a plurality of annularly disposed circular protector elements 14. Each protector element 14 being formed of a resilient material such as rubber, synthetic resin, steel plate or the like, so as to have a suitable resiliency. They are opposed to each other in given spaced relation and comprise side walls 15 having a height about half of the side wall portion 2 of the tire T and a peripheral wall 16 adapted to integrally bridge and connect outer peripheral ends of the side walls 15 and 15. The element 14 has a substantially U-shaped section as a whole. The protector element has an inner projecting side surface formed with reinforcing ribs 17 in a lattice-like fashion with the exception of a flange 15a at the inner peripheral end of the side walls 15. The flange 15a has one or more (two in the drawing) connecting holes 18 bored in opposite ends along the circumference thereof.

Finally, the bead stopper member $B_s$, which is circularly curved and with an open inner peripheral surface comprises a casing body 19 of the same height as the flange 15a of the protector element 14. The casing body 19 has an inner projecting side surface formed with reinforcing ribs 20 in a lattice-like fashion. The casing body 19 has projecting right and left sides formed with connecting protrusions 21, which may be slipped into the connecting holes 18, bored in opposed opposite ends, respectively, of the adjacent protector elements 14. The bead stopper members $B_s$ are integrally formed of synthetic resin, alluminum alloys, steel plate or the like and have the same number as the protector elements 14.

BEST MODE OF THE INVENTION

A safety wheel comprising a split rim divided into at least two sections in an axial direction of the wheel, said rim having annular flange portions formed on the opposite sides thereof and a base portion formed therebetween, a tubeless tire mounted on said split rim and having annular bead portions formed on the opposite sides thereof, and a flat protector of substantially annular configuration fitted at its inner peripheral surface over the base portion of said rim, and having at least one side surface arranged in abutting engagement with at least one of said tire bead portions for supporting the tire tread portion when air sealed within said tire is lost, said protector comprising a plurality of circumferentially divided circular protector elements connected with each other through bead stopper members, each of said bead stopper members being in abutting engagement at the outer peripheral surfaces on the opposite sides thereof with the inner surfaces of said flat protector members for restraining any relative movement therebetween.

Assembling the Safety Wheel

First a predetermined number of protector elements 14 are inserted into the tire T through an inner peripheral opening thereof and the protector elements are annularly disposed therein. Subsequently, the bead stopper member $B_s$ are inserted between the right and left flanges 15a, over the opposed opposite ends of the protector elements 14, and the connecting protrusions 21, are slipped into the corresponding connecting holes 18. Thereafter, the outboard and inboard rims 5, 6 of the split rim R are incorporated through opposite side surfaces of the tire T and connected by a plurality of connecting bolts 7. Then the rim bases 9 and 11 of the rims 5 and 6 are fitted along the inner peripheral surfaces of the flat protectors $F_p$ and bead stopper members $B_s$ so that the left and right bead portions 3 of the tire T are firmly held by the both sides of the bead stopper members $B_s$ both the rim flanges 10 and 12 of the split rim R through the side walls 15 of the flat protector $F_p$. As a consequence, the bead portions 3 are prevented from axial and circumferential movement with respect to the rim R. Also, the connecting protrusions 21 are prevented from slipping out of the connecting holes 18 so that the protector elements 14 may be firmly connected by the bead stopper members $B_s$. Accordingly, no disconnection of the flat protectors occurs even when the wheels are rotating.

A lubricants is sealed into an air chamber surrounded by the tire T and the split rim R so that when the tread portion 1 comes into contact with the outer peripheral surfaces of the flat protectors $F_p$ resulting from the puncture of the tire T or the like, the lubricant serves to decrease a frictional resistance produced therebetween and to prevent damages thereof and heat generation.

It is preferred that the lubricant be coated on the interior surface of the tire tread to provide lubricant when contact is made between the tire tread and the flat protector. As a result, friction between these portions can be greatly reduced to prevent overheating. Lubricants may be materials of low friction, which are liquid or solid at room temperature but liquify under frictional heat while maintaining uniform quality during long periods of use.

Examples of such lubricants are: silicon; low molecular weight polyalcohol, such as, ethylene glycol and glycerin; polyoxyalkylene glycol, such as, polyoxyethylene glycol and polyoxypropylene glycol; and polyoxyalkylene triol, such as polyoxypropylene triol.

Thus, when the air chamber of the tire T is filled with air of a given pressure to place the tire T in a normal inflated state, the wheel may be supported by the air pressure within the tire T as shown by the solid line in FIG. 1. Conversely, when the sealed air within the tire T is lost due to puncture of the tire T or the like, the tire T deflates and as a result, the tread portion 1 becomes flattened as shown by the dash-dotted contour lines and bears on the outer peripheral surface of the flat protector $F_p$ whereby, the vehicle may be resiliently supported by the flat protector $F_p$ in place of air pressure within the tire T. In this manner, the vehicle may be driven and travelled safely to the nearest repair shop.

Figure 5:
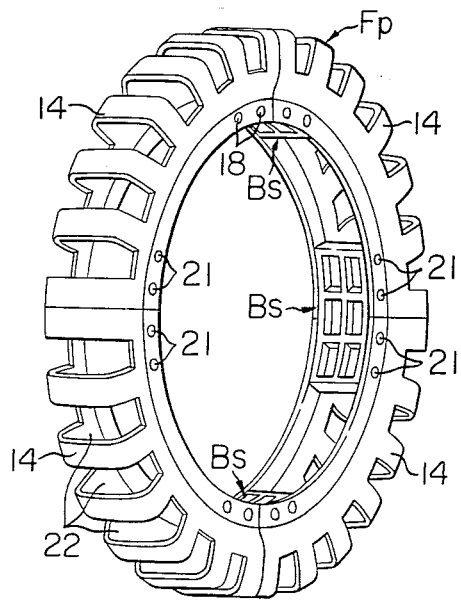
FIG. 5 is a perspective view showing a modified form of the flat protector.
Figure 6:
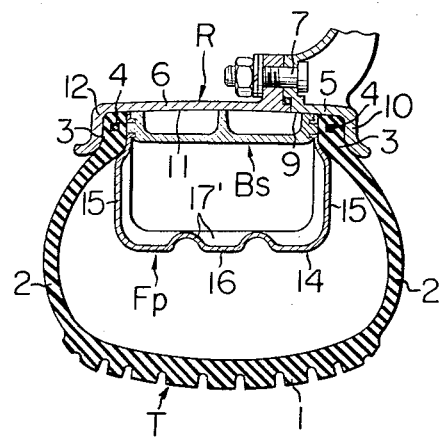
FIG. 6 is a partly longitudinal sectional view of a wheel showing another modified form of the flat protector.
Figure 7:
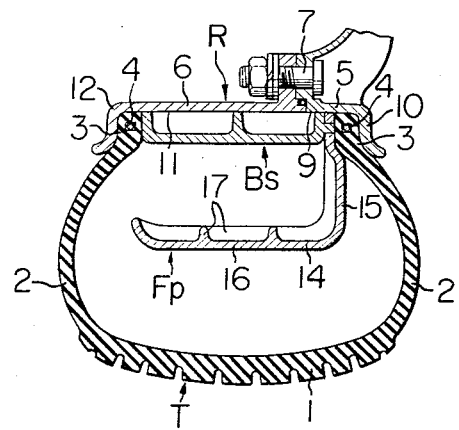
FIG. 7 is a partly longitudinal sectional view of a wheel showing a still another modified form of the flat protector.

It should be noted in the present invention that in the case the protector element 14 of the flat protector $F_p$ is formed of a material such as spring steel plate, which is particularly high in tensile strength and high in modulus, a plurality of cuts 22 may be formed peripherally in equally spaced relation between the opposite side walls 15 as shown in FIG. 5, to thereby provide a suitable balance between the strength and resiliency. It should be further noted that in the case the protector element 14 is formed of steel plate, lattice-like reinforcing ribs 17' may be manufactured by press forming as shown in FIG. 6. Further, in the case where a tire, which is large in sectional area for a load is used, it is also possible to form the protector element 14 into a substantially L-shaped cross section so as to be a cantilever.

In accordance with the present invention, as described above, since the annular flat protector is divided into a plurality of protector elements which are connected within the tubeless tire through the bead stopper members, the flat protector and bead stoppers may be incorporated into the tubeless tire in a simple and easy manner. In addition, the bead stopper members also serve as the connecting members for the adjacent protector elements. Therefore, it is possible to manufacture the devices easily and to minimize the worsening of riding comfort caused by an increase in weight below the springs of the vehicle.

Many modifications and variations of the present invention are possible in light of the above teachings. It is, therefore, to be understood that within the scope of the appended claims, the invention may be practiced otherwise than as particularly described.

What is claimed is:

1. An improved safety wheel apparatus, employing a split rim divided into at least two sections in an axial direction of the wheel, said rim having flange portions formed on its opposite sides and a base portion formed between said flange portions; a tubeless tire mounted in said split rim and having annular bead portions formed on its respective opposite sides; a flat protector of substantially annular configuration, fitted at its inner peripheral surface over the base portion of said rim; said flat protector being comprised of a plurality of circumferentially divided circular protector elements and having at least one side surface arranged in abutting engagment with at least one of said tire bead portions, for supporting the tire tread portion when air sealed within said tire is lost; and bead stopper members for restraining the displacement of said tire bead portions relative to said rim flange portions; said improvement is comprised of: said protector elements formed separate from said bead stopper members and interconnected with one another by means of said bead stopper members, to form a circular configuration.

2. A safety wheel apparatus as claimed in claim 1, wherein: said protector is formed of spring steel plate.

3. A safety wheel apparatus as claimed in claim 1, wherein: said protector is formed of rubber.

4. A safety wheel apparatus as claimed in claim 1, wherein: said protector elements are substantially U-shaped in cross section.

5. A safety wheel apparatus as claimed in claim 1, wherein: said air chamber surrounded by said tire and said rim is provided with lubricant sealed therein.

* * * * *